United States Patent [19]

Glennon

[11] Patent Number: 4,595,965
[45] Date of Patent: Jun. 17, 1986

[54] APPARATUS AND METHOD FOR DETECTING A ROTATING RECTIFIER FAULT

[75] Inventor: Timothy F. Glennon, Rockford, Ill.

[73] Assignee: Sundstrand Corporation, Rockford, Ill.

[21] Appl. No.: 563,257

[22] Filed: Dec. 19, 1983

[51] Int. Cl.$^4$ .............................................. H02H 7/06
[52] U.S. Cl. ........................................ 361/20; 361/87; 322/25; 322/33; 322/69
[58] Field of Search ............. 361/20, 21, 79, 87; 322/28, 25, 20, 59, 21, 22, 24, 69, 33, 23

[56] References Cited

U.S. PATENT DOCUMENTS

| | | | |
|---|---|---|---|
| 3,210,603 | 10/1965 | Calfee et al. | 361/20 |
| 3,534,228 | 10/1970 | Hyvarinen et al. | 361/20 |
| 3,621,369 | 11/1971 | Nagae et al. | 322/20 X |
| 3,705,331 | 12/1972 | South et al. | 361/20 |
| 4,275,344 | 6/1981 | Mori et al. | 361/21 X |
| 4,326,159 | 4/1982 | Aotsu et al. | 361/20 X |
| 4,400,659 | 8/1983 | Barron et al. | 322/25 X |
| 4,442,396 | 4/1984 | Hucker | 322/25 |
| 4,486,801 | 12/1984 | Jackovich et al. | 361/21 |

Primary Examiner—Patrick R. Salce
Attorney, Agent, or Firm—Wood, Dalton, Phillips, Mason & Rowe

[57] ABSTRACT

A microcomputer implemented apparatus and method for detecting the occurrence of a shorted diode in the rotating rectifier of a brushless alternator. The alternator current, voltage and power output and the alternator temperature are measured. The anticipated exciter field current is determined for the alternator output and operating conditions and compared with the actual exciter field current. An actual exciter field current in excess of the anticipated current indicates a rectifier fault.

14 Claims, 7 Drawing Figures

APPARATUS AND METHOD FOR DETECTING A ROTATING RECTIFIER FAULT

FIELD OF THE INVENTION

This invention relates to an apparatus and method for detecting the occurrence of a fault in the rectifier of the rotating exciter of a brushless alternator.

BACKGROUND OF THE INVENTION

A typical brushless alternator has an exciter field winding which is a part of the stator structure of the machine. The rotor of the alternator includes an exciter armature in which an alternating output is developed. A rectifier which is a part of the rotor is connected with the exciter armature and provides direct current excitation for the main field winding. The alternator output is developed in the stator armature windings. The exciter field is connected through a regulator transistor with a DC source. A voltage regulator circuit provides a pulse width modulated drive signal to the regulator transistor in accordance with the output voltage of the alternator.

A failed diode in the rotating rectifier causes malfunctioning of the regulator and must be detected to avoid damage to the system. Prior circuits have, for example, responded to the frequency and amplitude of the ripple current in the field winding, Calfee et al. U.S. Pat. Nos. 3,210,603 and Hyvarinen 3,534,228, or compared the exciter field voltage with the vector sum of the alternator armature current and voltage in a differential protection system, South U.S. Pat. No. 3,705,331.

SUMMARY OF THE INVENTION

The present invention provides an apparatus and method for detecting a rotating rectifier fault with which the actual exciter field current is compared with the exciter field current which is anticipated for the alternator output and operating conditions. More particularly, in one embodiment of the invention, the anticipated field current is calculated in accordance with the alternator KVA output and power factor, and the alternator operating temperature. In another embodiment the anticipated exciter field current is calculated in accordance with either the high phase current or the average phase current of the alternator.

In the preferred form of the invention, the alternator output and operating conditions are measured, connected by a multiplexer and analog-to-digital converter with a microcomputer which is programed to calculate the anticipated exciter field current and to compare the actual exciter field current with the calculated current.

Further features of the invention will readily be apparent from the specification and from the drawings.

Figure 1:
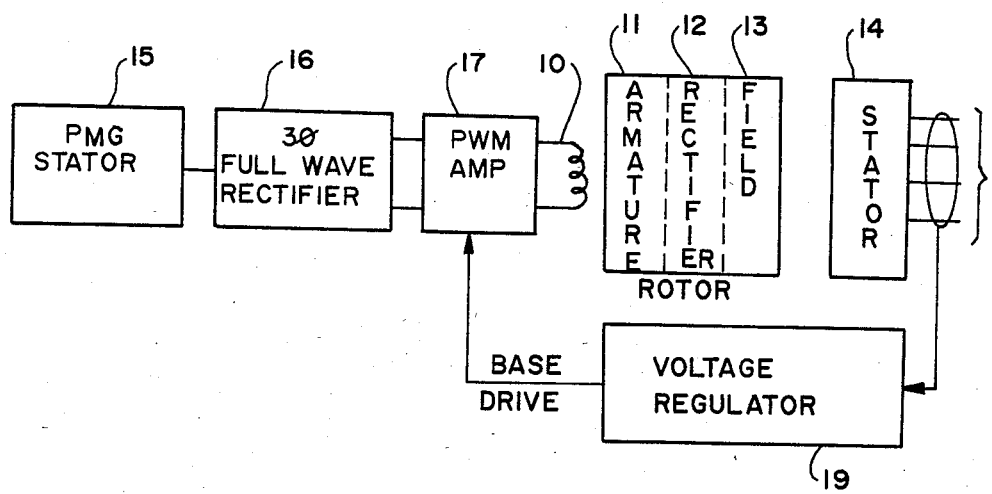
FIG. 1 is a block diagram of a brushless alternator illustrating the system in which the rectifier fault detector is used.

A brushless alternator system, elements of which are shown diagrammatically in FIG. 1, has an exciter with a stationary field winding 10. The rotor of the machine is driven by a prime mover (not shown) and includes an exciter armature winding 11 in which an alternating voltage, typically three phase, is generated. A rectifier 12 is connected with the armature and provides DC current to the main alternator field winding 13. Rectifier 12 is typically a 3-phase, full-wave rectifier using six semiconductor diodes. The alternator output is developed in stator 14, providing 3-phase power to a load (not shown). Power for the exciter field is, in the system illustrated, developed in the stator winding 15 of a permanent magnet generator (PMG) which has a permanent magnet (not shown) mechanically a part of the main machine rotor. The 3-phase output of the PMG is connected with a 3-phase full-wave rectifier 16 which provides DC power to a pulse width modulated amplifier 17 that controls the current to exciter field winding 10. Voltage regulator 19 is responsive to the output voltage and current of the main machine providing an appropriate drive signal to pulse width modulated amplifier 17.

Figure 2:
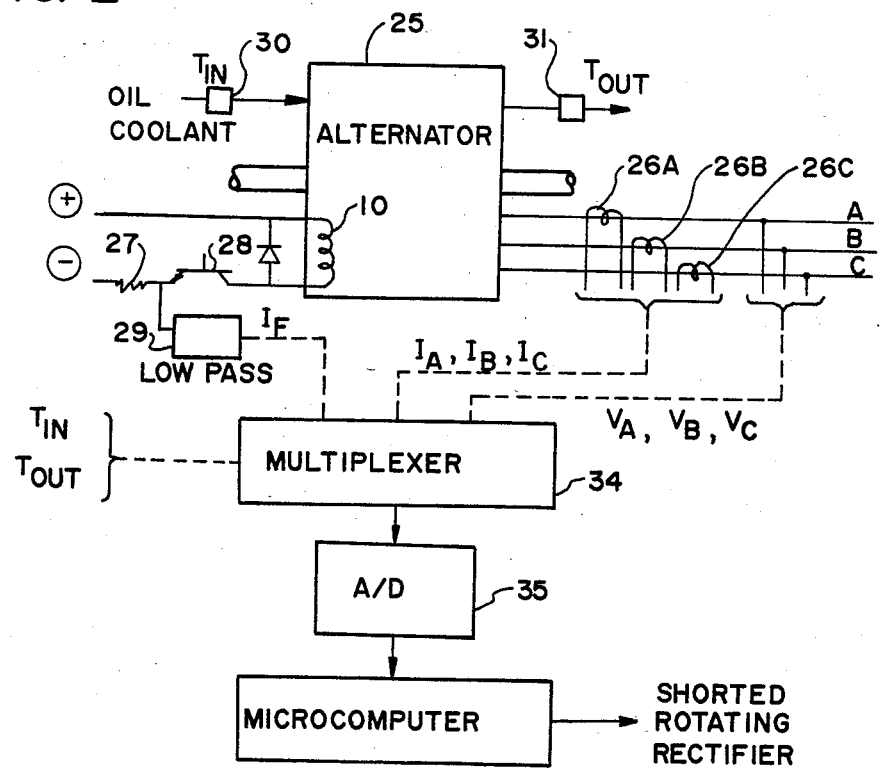
FIG. 2 is a diagram illustrating the alternator and microcomputer.

Alternator 25, FIG. 2, has a 3-phase output A, B, C to which a load (not shown) is connected. Current transformers $26_A$, $26_B$, $26_C$ measure the three phase currents $I_A$, $I_B$, $I_C$. The actual current $I_F$ to the exciter field winding 10 is measured by the voltage across resistor 27 in series with field current amplifier transistor 28. Low pass filter 29 removes the pulse frequency.

An oil coolant flows through the alternator. The inlet and outlet temperatures are measured, as by thermal sensors 30, 31. The phase currents, phase voltages $V_A$, $V_B$, $V_C$, exciter field winding current and coolant temperature signals are sampled periodically by an analog signal multiplexer 34. The signals are connected one at a time with an analog-to-digital signal converter 35 and the digital signals are connected with programed microcomputer 36. The microcomputer may, for example, be a part of a control unit (not shown) and detects a rectifier fault as one of a number of functions in the control and operation of the alternator.

The microcomputer calculates the anticipated exciter field current in accordance with the alternator output and operating conditions. The anticipated field current is compared with the actual field current. If the actual current exceeds that which is anticipated by an excessive amount, an indication is given of the occurrence of a shorted diode in the rotating rectifier. The fault indication may be in the form of an alarm to an attendant or operator or it may cause the control unit to terminate operation of the alternator.

Figure 3:
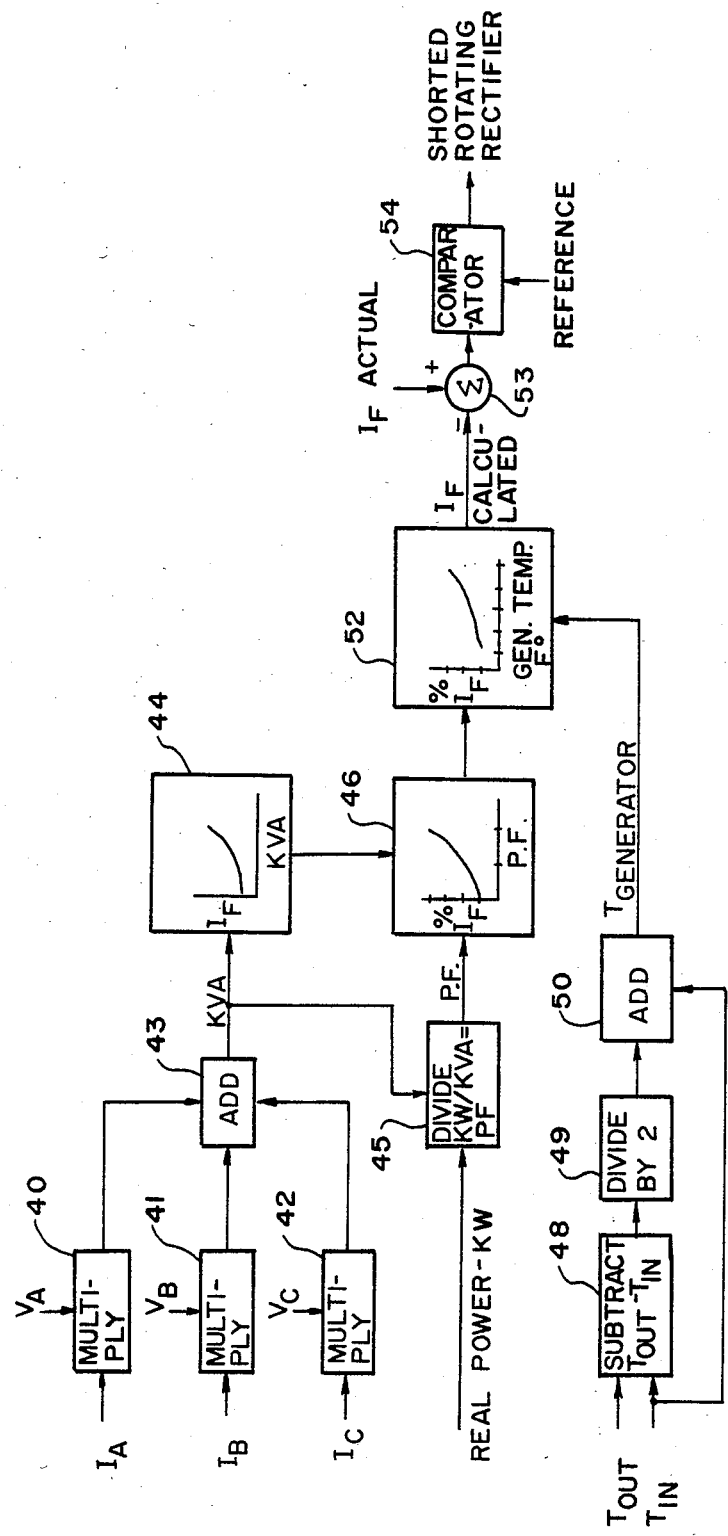
FIG. 3 is a flow diagram of a preferred embodiment of the invention.
Figure 4:
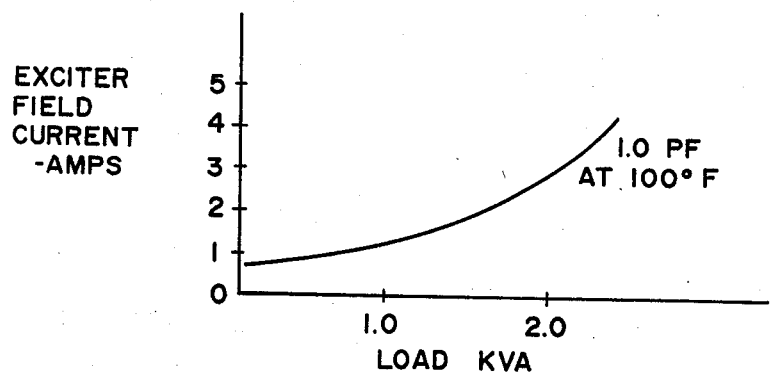
FIG. 4 is a plot of the anticipated exciter field current as a function of alternator output in KVA and a power factor of 1.

The operation of the programed microcomputer 36 with respect to rotating rectifier fault detection will be described in connection with the functional diagram of FIG. 3. The three phase currents $I_A$, $I_B$, $I_C$ are multiplied by the respective phase voltages $V_A$, $V_B$ and $V_C$ at Multiply blocks 40, 41 and 42. The output of each Multiply block is the volt-amperes supplied to the load by one phase. The three volt-ampere signals are combined at Add block 43 to provide a signal KVA representing the total volt-ampere output of the alternator. This signal is connected with a Function block 44 which develops an output signal representing the exciter field current. The Transfer Function of block 44 is shown in more detail in FIG. 4 where the exciter field current is plotted as a function of KVA load for a power factor of 1.0 and an operating temperature of 100° F.

Figure 5:
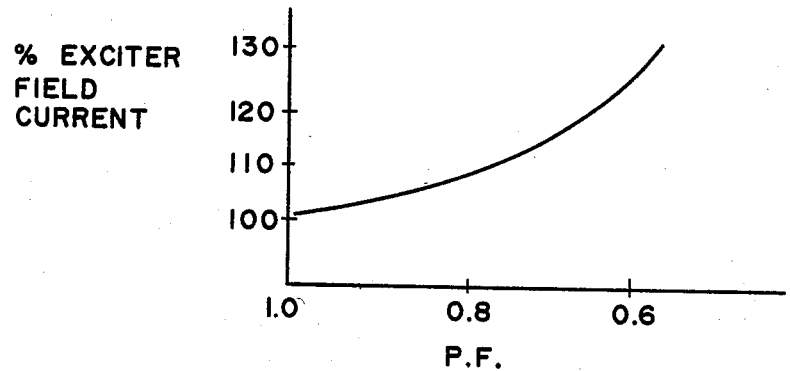
FIG. 5 is a plot of the adjustment of the anticipated exciter field current for power factors less than 1.

The signal representing the KVA output of the alternator is also connected with a Divide block 45 at which the real power in kilowatts delivered by the alternator is divided by the KVA output to determine the load power factor PF. The anticipated field current signal from block 44 and the power factor from block 45 are combined in Function block 46 to provide an output representing the exciter field current compensated for power factor in accordance with the function illustrated in FIG. 5. With a load power factor less than 1.0 the anticipated exciter field current is greater than that developed by Function block 44.

Figure 6:
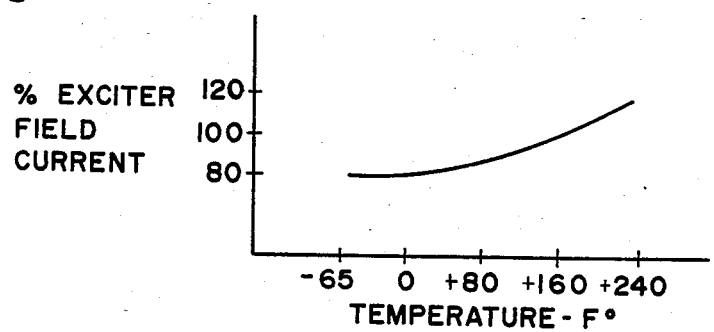
FIG. 6 is a plot of the adjustment of the anticipated exciter field current for alternator temperature.

The signals representing the coolant temperature out and in are connected with Subtract block 48. The difference is divided by 2 at block 49 and the quotient added to the coolant In temperature at block 50, providing a signal representing the average temperature of the generator. The output of Power Factor Function block 46 and the generator temperature signal are connected with Function block 52 which develops a temperature compensated signal in accordance with the relationship illustrated in FIG. 6. The resulting calculated or anticipated field current signal is subtracted from the actual field current signal at summer 53. The difference and a reference or threshold signal are connected with comparator 54. If the difference exceeds the reference, a rotating rectifier fault is indicated. An alarm is given or the alternator shut down as desired.

Figure 7:
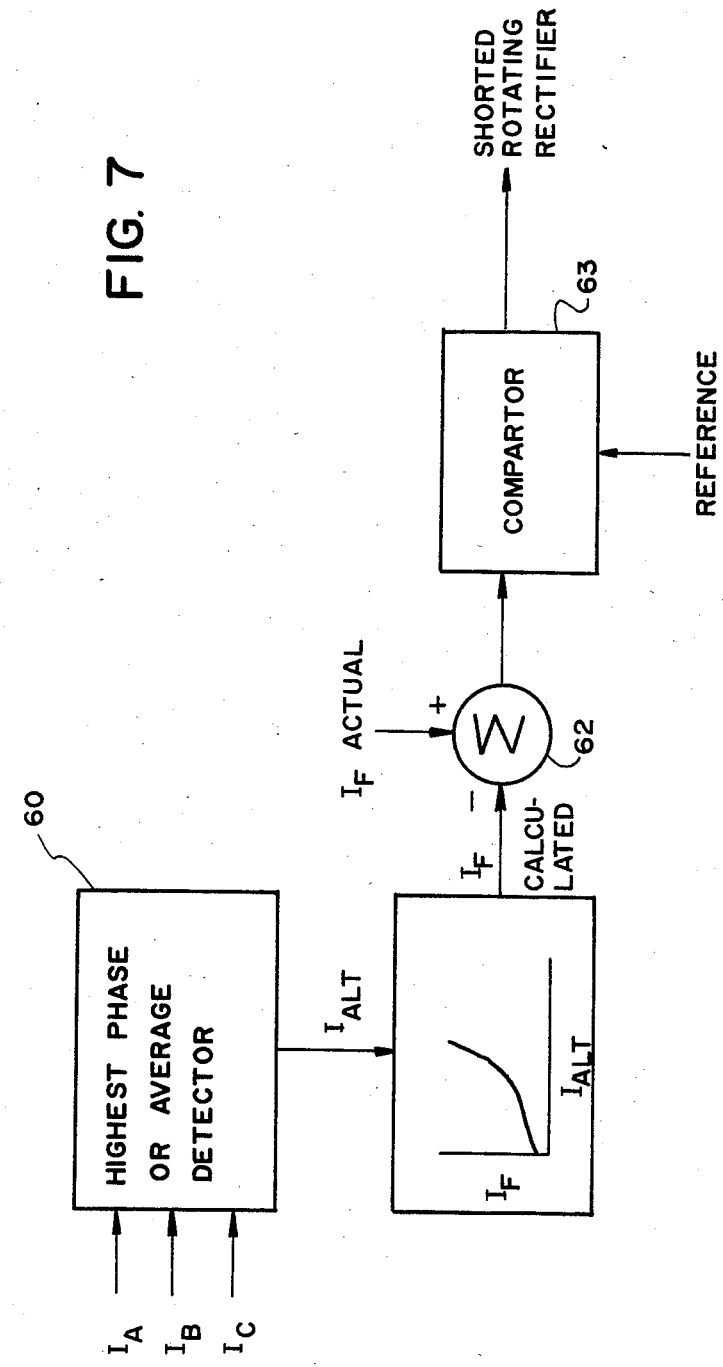
FIG. 7 is a flow diagram of a simplified embodiment of the invention.

A simplified implementation of the invention is illustrated in FIG. 7. The signals representing the three phase currents $I_A$, $I_B$, $I_C$ are connected with a detector block 60 which may, for example, select the highest phase current or determine the average of the phase currents. The signal $I_{ALT}$ representing the alternator current is connected with Function block 61 which develops a signal representing the anticipated field current required for the alternator output. The anticipated field current signal is subtracted from the actual field current signal at Summer block 62. The difference and a threshold or reference signal are connected with comparator 63. Again, if the actual field current signal exceeds the anticipated field current signal by more than a selected amount, a rotating rectifier fault is indicated.

I claim:

1. In a brushless alternator having a stationary exciter field winding, a circuit supplying current to said exciter field winding, a rotor with an exciter armature, a rectifier connected with said armature and a main field winding connected with said rectifier and a stator winding in which the alternator output is developed coupled with the main field winding, a rectifier fault detector comprising:
   means responsive to the alternator output and to an operating condition of the alternator for developing a signal representing the anticipated exciter field current;
   means measuring the actual exciter field current and developing a signal representative thereof;
   means comparing said anticipated and actual exciter field current signals; and
   means responsive to said comparing means indicating a rotating rectifier fault.

2. The rectifier fault detector of claim 1 in which the first mentioned means is responsive to the volt-amperes delivered by the alternator.

3. The rectifier fault detector of claim 1 in which the first mentioned means is responsive to the power factor of the output from the alternator.

4. The rectifier fault detector of claim 1 in which the first mentioned means is responsive to the volt-amperes delivered by the alternator and to the power factor of the output of the alternator.

5. The rectifier fault detector of claim 2 for a multi phase alternator, in which the first mentioned means is responsive to the sum of the volt amperes delivered by each phase of the alternator.

6. The rectifier fault detector of claim 1 for a multi phase alternator, in which the first mentioned means is responsive to the average current output delivered by the phases of the alternator.

7. The rectifier fault detector of claim 1 for a multi phase alternator, in which the first mentioned means is responsive to the high phase current output delivered by the phases of said alternator.

8. The rectifier fault detector of claim 1 in which the first mentioned means is responsive to the operating temperature of the alternator.

9. In a brushless alternator having a stationary exciter field winding, a circuit supplying current to said exciter field winding, a rotor with an exciter armature, a rectifier connected with said armature, and a main field winding connected with said rectifier, and a stator winding in which the alternator output is developed, coupled with the main field winding, the method for detecting a rectifier fault, comprising:
   measuring the alternator output;
   measuring an alternator operating condition;
   determining the anticipated exciter field current for the alternator output and operating condition;
   measuring the actual exciter field current; and
   comparing the anticipated exciter field current with the actual exciter field current.

10. The method of claim 9 for detecting a rectifier fault in which the measurement of the alternator output includes measurement of alternator output current, output voltage and output power; and
   determination of the anticipated field current includes determining the anticipated field current for the output current and voltage, determining the output power factor and modifying the anticipated current for the power factor.

11. The method of claim 9 for detecting a rectifier fault in which the alternator operating condition measured is the alternator temperature, and the anticipated exciter field current is adjusted for temperature.

12. In a brushless alternator having a stationary exciter field winding, a circuit supplying current to said exciter field winding, a rotor with an exciter armature, a rectifier connected with said armature and a main field winding connected with said rectifier and a stator winding in which the alternator output is developed coupled with the main field winding, a rectifier fault detector comprising:
   a programed microcomputer;
   means measuring the alternator output current, voltage and power and the alternator temperature and the actual exciter field current and developing signals representative thereof;
   means multiplexing the measured alternator output and temperature signals and the exciter field current signal to the microcomputer, the programmed microcomputer developing from the alternator output and temperature signal the anticipated exciter field current for the alternator KVA output and modifying the anticipated field current for power factor and temperature, and comparing the modified anticipated exciter field current with the actual exciter field current.

13. In a multiphase brushless alternator having a stationary exciter field winding, a circuit supplying current to said exciter field winding, a rotor with an exciter armature, a rectifier connected with said armature and a main field winding connected with said rectifier and a stator winding in which the alternator output is developed coupled with the main field winding, a rectifier fault detector comprising:

means responsive to the high phase current of the alternator output phase currents for developing a signal representing the anticipated exciter field current;

means measuring the exciter field current and developing a signal representative thereof;

means comparing the anticipated and actual exciter field current signals; and means responsive to said comparing means indicating a rotating rectifier fault.

14. In a multiphase brushless alternator having a stationary exciter field winding, a circuit supplying current to said exciter field winding, a rotor with an exciter armature, a rectifier connected with said armature and a main field winding connected with said rectifier and a stator winding in which the alternator output is developed coupled with the main field winding, a rectifier fault detector comprising:

means responsive to the average of the alternator output phase currents for developing a signal representing the anticipated exciter field current;

means measuring the exciter field current and developing a signal representative thereof;

means comparing the anticipated and actual exciter field current signals; and means responsive to said comparing means indicating a rotating rectifier fault.

* * * * *